United States Patent [19]

Misumi et al.

[11] Patent Number: 5,230,936
[45] Date of Patent: Jul. 27, 1993

[54] JOINT BOOTS HAVING EXCELLENT COLD RESISTANCE

[75] Inventors: Kozo Misumi, Osaka; Kazuya Matsumoto, Tokyo; Tetsuo Takahashi, Saitama; Takehiko Asano, Saitama; Teruo Akema, Saitama; Toshihiko Suenaga, Saitama, all of Japan

[73] Assignees: Daisco Co., Ltd., Osaka; Honda Motor Co., Ltd., Tokyo; Ohtsuka Poly-Tech Co., Ltd., Saitama, all of Japan

[21] Appl. No.: 774,913

[22] Filed: Oct. 11, 1991

[30] Foreign Application Priority Data

Oct. 15, 1990 [JP] Japan .................................. 2-276632

[51] Int. Cl.$^5$ ............................ F16D 3/84; C08K 5/37
[52] U.S. Cl. ................................. 428/36.6; 428/36.9; 464/170; 464/173; 464/175; 277/212 FB
[58] Field of Search .................... 428/36.6, 36.9; 525/346, 335, 348; 464/170, 173, 175; 277/212 FB

[56] References Cited

U.S. PATENT DOCUMENTS

| | | | |
|---|---|---|---|
| 4,165,416 | 8/1979 | Matoba et al. | 525/346 |
| 4,237,247 | 12/1980 | Matoba et al. | 525/346 |
| 4,902,545 | 2/1990 | Ohta et al. | 428/36.6 |

Primary Examiner—Ellis P. Robinson
Assistant Examiner—Charles R. Nold
Attorney, Agent, or Firm—Armstrong, Westerman, Hattori, McLeland & Naughton

[57] ABSTRACT

The joint boot having excellent cold resistance is obtained by compounding the cross-linking components (a), (b) and (c) with chlorinated polyethylene having a chlorine content of 31 to 34% by weight and molding the resulting compound under thermal conditions.

(a) A mercaptotriazine compound,
(b) at least one compound selected from the group consisting of amines having a boiling point of not lower than 110° C., organic acid salts of the amines or addition products thereof, diarylguanidine, condensation products of aniline and aldehydes, and 2-benzothiazylsulfenamides of primary or secondary amines, and
(c) a metal compound as an acid acceptor.

17 Claims, 1 Drawing Sheet

JOINT BOOTS HAVING EXCELLENT COLD RESISTANCE

FIELD OF THE INVENTION

This invention relates to a joint boot provided in joints such as automobile drive shaft joints.

DESCRIPTION OF PRIOR ART

For example, in automobile drive shaft, an universal joints are provided on a final reduction gear side and a wheel side, and in each joint, a boot for enclosing grease is provided so as to cover the joint.

FIG. 1 is a diagrammatic view showing the drive shaft portion. The drive shaft (1) receives a driving force via an inboard joint (2) from a final reduction gear (3), and this driving force is transmitted to an axle hub and a wheel (5) via an outboard joint (4). At each of joints (2) and (4), a bellows-like boot (6) is provided.

This boot (6) was hitherto molded from chloroprene rubber, and its small-diameter side portion is fitted on the drive shaft (1). Its large-diameter side portion is secured to each joint side. The boot (6) has grease to lubricate the joint portions.

In recent years, with an increased durability of automobiles the boot (6) is also required to have a high level of durability. As a material for boots meeting this requirement, an attempt is made to use chlorinated polyethylene because chlorinated polyethylene has excellent thermal resistance and ozone resistance (Japanese Unexamined Patent Publication Nos. Sho-61-291627 and Sho-63-297867).

In this boot (6), the drive shaft (1) is sometimes inclined to the final reduction gear (3) or the axle hub and the wheel (5) at an angle of, for example, 40°. Actually, the boot (6) is frequently used at a very low temperature of, for example, −40° C. in the bent state shown in FIG. 2. It has been found that under such service conditions a boot molded from chlorinated polyethylene as a rubber material has a problem of insufficient cold resistance.

It is known that by sufficiently crosslinking chlorinated polyethylene, the rubber obtained exhibits excellent thermal resistance, grease resistance and ozone resistance (Japanese Examined Patent Publications Nos. Sho-54-15458, Sho-54-15459, Sho-55-39250 and Sho-63-42933). However, to mold a joint boot by using a crosslinkable chlorinated polyethylene composition is not disclosed or taught.

SUMMARY OF THE INVENTION

The object of this invention is to provide a joint boot having a high level of durability by using a specified chlorinated polyethylene as a rubber material and by molding by use of specific crosslinking components.

The joint boot having excellent cold resistance is obtained by compounding the crosslinking components (a), (b) and (c) with chlorinated polyethylene having chlorine in a content of 31 to 34% by weight and molding the compound under thermal crosslinking conditions:

(a) A mercaptotriazine compound, (b) at least one compound selected from the group consisting of amines having a boiling point of not lower than 110° C., organic acid salts of the amines or addition products thereof, diarylguanidine, condensation products of aniline and aldehydes, and 2-benzothiazylsulfenamides of primary or secondary amines, and (c) a metal compound as an acid acceptor.

According to this invention, by crosslinking a chlorinated polyethylene having a specified chlorine content as a rubber material with specified crosslinking components, a joint boot having excellent moldability, cold resistance and grease resistance over conventional products can be obtained.

DETAILED DESCRIPTION OF PREFERRED EMBODIMENT

Figure 1:
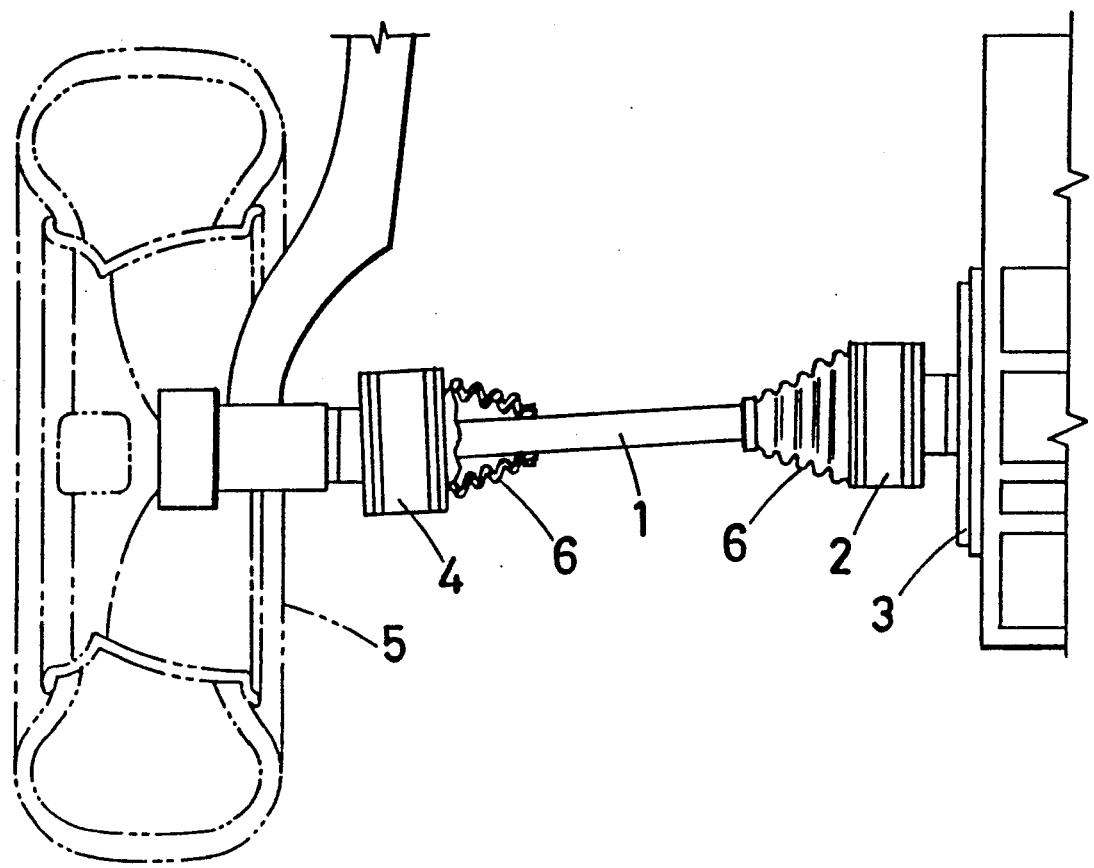
FIG. 1 is a diagrammatic view showing a boot secured to a drive shaft.
Figure 2:
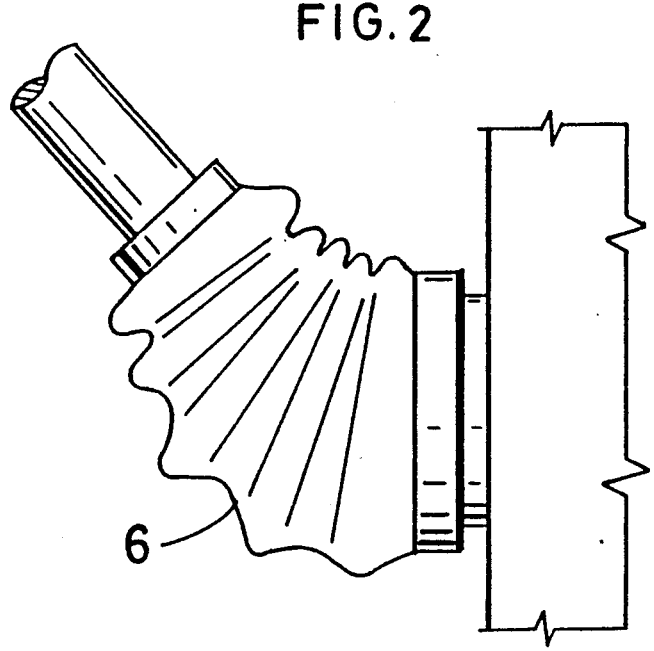
FIG. 2 is a diagrammatic view showing the bent state of a boot.

Chlorinated polyethylene used in this invention is obtained by chlorinating a powder or particles of polyethylene in an aqueous suspension or chlorinating polyethylene dissolved in an organic solvent. The product obtained by the aqueous suspension method is preferred. The starting polyethylene may be a monopolymer of ethylene, a copolymer of ethylene with at most 10% by weight of an $\alpha$-olefin or a copolymer of ethylene and a polar monomer. The $\alpha$-olefin may generally have 12 or less carbon atoms, and examples include propylene-1, butene-1, heptene-1, hexene-1 and 4-methylpentene-1. Examples of the polar monomer are vinyl acetate, alkyl esters of acrylic acid such as methyl acrylate, ethyl acrylate and alkyl esters of methacrylic acid such as methyl methacrylate and ethyl methacrylate. Polyethylene preferably has a density of 0.97 to 0.91, more preferably 0.96 to 0.93, and a melt index of not more than 100, preferably 10 to 0.01.

The chlorine content of chlorinated polyethylene is 31 to 34% by weight, preferably 31.5 to 33.5% by weight. The chlorinated polyethylene having a chlorine content of 31 to 34% by weight may be a single chlorinated polyethylene having the above chlorine content, a mixture of at least two chlorinated polyethylenes having the above chlorine content but having different Mooney viscosities and a mixture of at least two chlorinated polyethylenes having different chlorine contents but having the chlorine content within the above range after mixed. If the chlorine content is below the above range, the polyethylene has decreased grease resistance. If the chlorine content is above the aforesaid range, the cold resistance of the chlorinated polyethylene is not sufficient.

The mercaptotriazine used in the invention as the crosslinking component (a) is represented by the following general formula (I):

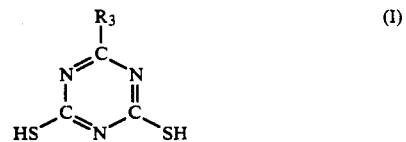

wherein $R_3$ is a mercapto group, an alkoxy group, an alkylamino group, a dialkylamino group, a cycloalkylamino group, a dicycloalkylamino group, or an arylamino group.

Examples of the general formula (I) include 1,3,5-trithiocyanuric acid, 1-methoxy-3,5-dimercaptotriazine, 1-hexylamino-3,5-dimercaptotriazine, 1-diethylamino- 3,5-di-mercaptotriazine, 1-dibutylamino-3,5-dimercaptotriazine, 1-cyclohexylamino-3,5-dimercaptotriazine and 1-phenylamino-3,5-dimercaptotriazine.

As the crosslinking component (b) used in this invention, amines having a boiling point of at least 110° C., especially aliphatic or cyclic aliphatic primary, secondary or tertiary amines, having 5 to 20 carbon atoms and a pK value of not more than about 4.5 are preferred. Suitable examples are n-hexylamine, octylamine, dibutylamine, tributylamine, trioctylamine, di(2-ethylhexyl)amine, dicyclohexylamine, and hexamethylenediamine.

The organic acid salts of the amines are preferably salts of amines having a pK value of not more than about 4.5 and organic acids having a pK value of at least about 2.0. Suitable examples of such amine organic acid salts include n-butylamine acetate, dibutylamine oleate and hexamethylenediamine carbamate. An especially preferred organic acid salt is 2-mercaptobenzothiazole salt of dicyclohexylamine.

Examples of the diarylguanidine are diphenylguanidine and ditolylguanidine.

Preferred condensation products of aniline and aldehydes are condensation products of aniline and at least one aldehyde having 1 to 7 carbon atoms. Examples include a condensation product of aniline and butylaldehyde, a condensation product of aniline and heptaaldehyde and a condensation product of aniline and acetaldehyde.

The 2-benzothiazylsulfenamide of primary or secondary amines is represented by the following general formula (II)

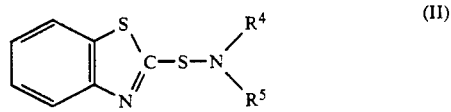

(II)

wherein $R^4$ and $R^5$ are, the same or different, a hydrogen atom, an alkyl group, a cycloalkyl group or an aralkyl group. Each of the groups has 1 to 12 carbon atoms and does not have a substituent containing a hetero atom. $R^4$ and $R^5$ may be bonded to each other to form a hydrocarbon ring, or may form a hetero ring via a hetero atom. However, $R^4$ and $R^5$ are not hydrogen atoms at the same time.

The primary or secondary amine for forming the sulfenamide preferably have a pK value of not more than about 4.5. Examples include cyclohexylamine, butylamine, diethylamine, dipropylamine, dibutylamine, dihexylamines, dioctylamine, dilaurylamine, dicyclohexylamine, piperidine, pipecoline, morpholine and piperazine.

The crosslinking component (c) in this invention, namely a metal compound acting as an acid acceptor gives stability to the crosslinked product and a suitable crosslinking speed. Specific examples include oxides, hydroxides, carboxylates, silicates, carbonate, phosphites and borates of metals of Group II of the periodic table, and oxides, basic phosphites, basic carbonates, basic carboxylates, basic sulfites and tribasic sulfates of metals of Group IVA. Examples of these metal compounds include magnesia, magnesium hydroxide, barium hydroxide, magnesium carbonate, barium carbonate, slaked lime, quick lime, calcium silicate, calcium carbonate, calcium stearate, zinc stearate, calcium phthalates, magnesium phosphite, calcium phosphite, zinc flower, tin oxide, litharge, red lead, white lead, dibasic lead, phthalate, dibasic lead carbonate, tin stearate, basic lead phosphite, basic tin phosphite, basic lead sulfite, and tribasic lead sulfate.

The preferred amounts of the crosslinking components (a), (b) and (c) are as follows. The amount of component (a) per 100 parts by weight of chlorinated polyethylene (including the copolymer) is 0.1 to 5 parts by weight, preferably 0.5 to 3 parts by weight, and the amount of the component (c) is 0.5 to 20 parts by weight, preferably 1 to 10 parts by weight, per 100 parts of chlorinated polyethylene. The amount of the component (b) is 0.5 to 3 moles, preferably 0.7 to 2 moles, per mole of the component (a).

The composition of this invention may include various additives normally used in the art such as fillers, reinforcing agents such as carbon black, plasticizers such as di-(2-ethylhexyl)sebacate, stabilizers, antioxidants, lubricants, viscosity imparting agents, pigments and fire retardants as required. To improve abrasive property and moldability, a small amount of a thermoplastic resin and rubber may be added, and for increasing strength and rigidity, short fibers may be added optionally.

The compound consisting of chlorinated polyethylene, the crosslinking components (a), (b) and (c) and compounding agents optionally added can be kneaded by a usual rubber kneader such as a roll, a kneader, or an intermixer. The resulting kneaded product may be molded under crosslinking conditions to form a boot. The compound may be pressed or injected by an injecting molding machine under crosslinking conditions. The crosslinking temperature is preferably 100° to 200° C., more preferably 150° to 190° C., and the crosslinking time is preferably several minutes to 2 hours, more preferably 5 to 90 minutes, determined by the temperature used.

EXAMPLE

The non-limitative Examples of this invention will be explained.

(i) Production of chlorinated polyethylene

A 100-liter glass-lined pressurized reactor was charged with 5 kg of polyethylene powder (density 0.945 melt index 0.01) of ethylene and butene-1 (99/1 mole ratio) together with 70 liters of water, a wetting agent and a dispersant. In the aqueous suspension, chlorine gas was reacted with the polyethylene at 100° to 135° C. under a pressure of 1 to 5 kg/cm² to obtain seven chlorinated polyethylenes having the chlorine contents and Mooney viscosities shown in Table 1 (CPE No. 1-7). Polyethylene powder (density 0.962, melt index 0.1) produced by homopolymerizing ethylene was chlorinated under the same conditions to obtain chlorinated polyethylene (CPE No. 8).

TABLE 1

| CPE NO. | 1 | 2 | 3 | 4 | 5 | 6 | 7 | 8 |
|---|---|---|---|---|---|---|---|---|
| Chlorine content (weight %) | 30.8 | 32.1 | 32.8 | 34.0 | 35.2 | 30.1 | 39.8 | 33.0 |
| Mooney viscosity @ 140° C. $NL_{1+4}$ | 80.5 | 82.0 | 83.0 | 83.5 | 84.5 | 80.0 | 89.5 | 63.5 |

Examples 1 to 5 and Comparative Example 1 to 2

The chlorinated polyethylene, the crosslinking components (a), (b) and (c) and the additives were compounded in the proportions shown in Table 2, and the resulting compound was kneaded by a kneader. The resulting kneaded product was molded by an injection molding machine and heated at 170° C. for 10 minutes to produce boots.

The resulting boots were subjected to a grease resistance test and a cold resistance test by the following methods. The results of these tests are shown in Table 2.

(1) A method of testing grease resistance

Boot test pieces (2 cm×2 cm) were immersed in grease at 120° C. for 70 hours. Then, the volume expansion factors were measured.

(2) A method of testing cold resistance

Boots were mounted on constant speed joints, and set on a rotation life tester of the constant joint boot.
 (i) The boots were allowed to stand at −40° C. for 70 hours.
 (ii) At −40° C. and 100 rpm for 10 minutes, the joint was operated (at a joint angle of 40°)
 (iii) At −40° C., the boots were allowed to stand for 10 minutes.
 (v) The cycles (ii) and (iii) were repeated through ten cycles.

Comparative Example 3

Chlorinated polyethylene in CPE No. 3 was used, and the crosslinking agent was changed to dicumyl peroxide. With the following compounding recipe, a boot was molded in accordance with the same operation as in Examples. This boot had the defect that when the boot was expanded with air, a crack occurred in the bellows.

Compounding (parts by weight): CPE No. 3 100: carbon black 70: di(2-ethylhexyl) sebacate plasticizer 30: MgO 10: triallyl isocyanurate 4: dicumyl peroxide 2.

The foregoing Examples and Comparative Examples show that the chlorinated polyethylene crosslinked with the crosslinking components used in this invention has excellent cold resistance and grease resistance for joint boots when containing chlorine within the range of 31 to 34% by weight.

It is also shown that the chlorinated polyethylene crosslinked with the crosslinking agents other than those of this invention has a problem in moldability even though containing chlorine within the foregoing range.

What is claimed is:

1. A joint boot having excellent cold resistance and great resistance obtained by compounding chlorinated polyethylene having a chlorine content of 31 to 34% by weight with the following crosslinking components (a), (b) and (c), and molding the compound under thermal crosslinking conditions:
    (a) A mercaptotriazine compound,
    (b) at least one compound selected from the group consisting of amines having a boiling point of not lower than 110° C., organic acid salts of the amines or addition products thereof, diarylguanidine, condensation products of aniline and aldehydes, and 2-benzothiazylsulfenamides of primary or secondary amines, and
    (c) a metallic compound as an acid acceptor.

2. The boot of claim 1 wherein the polyethylene has a density of 0.97 to 0.91 and a melt index of not more than 100.

3. The boot of claim 1 wherein the mercaptotriazine is represented by general formula (I)

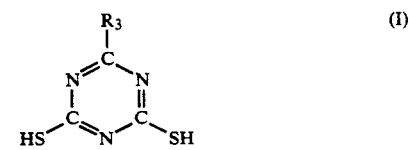

wherein $R_3$ represents a mercapto group, an alkoxy group, an alkylamino group, a dialkylamino group, a cycloalkylamino group, a dicycloalkylamino group or an arylamino group.

4. The boot of claim 3 wherein the mercaptotriazine represented by the general formula (I) is selected from the group consisting of 1,3,5-trithiocyanuric acid, 1-methoxy-3,5-dimercaptotriazine, 1-hexylamino-3,5-dimercaptotriazine, 1-diethylamino-3,5-dimercaptotiazine, 1-dibutylamino-3,5-dimercaptotriazine, 1-cyclohexylamino-3,5-dimercaptotriazine and 1-phenylamino-3,5-dimercaptotriazine.

TABLE 2

|  | (Composition by weight) | | | | | | | |
|---|---|---|---|---|---|---|---|---|
|  | Example | | | | | | Comparative Example | |
|  | 1 | 2 | 3 | 4 | 5 | 6 | 1 | 2 |
| CPE No. 1 |  |  |  |  |  |  | 100 |  |
| CPE No. 2 | 100 |  |  |  |  | 80 |  |  |
| CPE No. 3 |  | 100 |  |  |  |  |  |  |
| CPE No. 4 |  |  | 100 |  |  |  |  |  |
| CPE No. 5 |  |  |  | 50 |  |  |  | 100 |
| CPE No. 6 |  |  |  | 50 | 75 |  |  |  |
| CPE No. 7 |  |  |  |  | 25 |  |  |  |
| CPE No. 8 |  |  |  |  |  | 20 |  |  |
| Chlorine content (%) | 32.1 | 32.8 | 34.0 | 32.7 | 32.5 | 32.5 | 30.8 | 35.2 |
| Carbon black | 60 | 60 | 60 | 60 | 60 | 60 | 60 | 60 |
| Di(2-ethylhexyl) sebacate | 35 | 35 | 35 | 35 | 35 | 35 | 35 | 35 |
| 1,3,5-trithiocyanuric acid | 1.25 | 1.25 | 1.25 | 1.25 | 1.25 | 1.25 | 1.25 | 1.25 |
| 2-mercaptobenzothiazole salt of dicyclohexylamine. | 2.5 | 2.5 | 2.5 | 2.5 | 2.5 | 2.5 | 2.5 | 2.5 |
| Magnesia | 5 | 5 | 5 | 5 | 5 | 5 | 5 | 5 |
| Grease resistance (%) | 7.8 | 6.5 | 2.0 | 9.6 | 7.4 | 5.8 | 13.2 | 1.6 |
| Cold resistance | no change | no change | no change | no change | no change | no change | no change | Fractured |

5. The boot of claim 1 wherein the amines having a boiling point of at least 110° C. are aliphatic or cyclic aliphatic primary, secondary or tertiary amines having 5 to 20 carbon atoms and a pK value of not more than about 4.5.

6. The boot of claim 5 wherein the amines are selected from the group consisting of n-hexylamine, octylamine, dibutylamine, tributylamine, trioctylamine, di(2-ethylhexyl)amine, dicyclohexylamine, and hexamethylenediamine.

7. The boot of claim 1 wherein the organic acid salts of amines are salts of amines having a pK value of not more than about 4.5 and organic acids having a pK value of at least about 2.0.

8. The boot of claim 7 wherein the organic acid salts of the amines are selected from the group consisting of n-butylamine acetate, dibutylamine oleate, hexamethylenediamine carbamate and 2-mercaptobenzothiazole salt of dicyclohexylamine.

9. The boot of claim 1 wherein the diarylguanidines are selected from the group consisting of diphenylguanidine and ditolylguanidine.

10. The boot of claim 1 wherein the condensation products of aniline and aldehydes are condensation products of aniline and at least one kind of aldehyde having 1 to 7 carbon atoms.

11. The boot of claim 10 wherein the aldehydes are selected from the group consisting of butylaldehyde, heptaaldehyde and acetaldehyde.

12. The boot of claim 1 wherein the 2-benzothiazylsulfenamide of primary or secondary amines is represented by the following general formula (II);

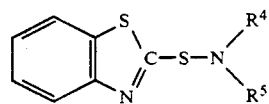
(II)

wherein $R^4$ and $R^5$ are, the same or different, a hydrogen atom, an alkyl group, a cycloalkyl group or an aralkyl group, each of the groups has 1 to 12 carbon atoms and does not have a substituent containing a hetero atom, $R^4$ and $R^5$ may be bonded to each other to form a hydrocarbon ring or may form a hetero ring via a hetero atom, and $R^4$ and $R^5$ are not hydrogen atoms at the same time.

13. The boot of claim 12 wherein the primary or secondary amines for forming the sulfenamide have a pK value of not more then about 4.5.

14. The boot of claim 13 wherein the amines are selected from the group consisting of cyclohexylamine, butylamines, diethylamine, dipropylamines, dibutylamines, dihexylamines, dioctylamines, dilaurylamines, dicyclohexylamine, piperidine, pipecoline, morpholine and piperazine.

15. The boot of claim 1 wherein the metallic compound (c) as an acid acceptor is selected from the group consisting of oxides, hydroxides, carboxylates, silicates, carbonate, phosphites and borates of metals of Group II of the periodic table, and oxides, basic phosphites, basic carbonates, basic carboxylates, basic sulfites and tribasic sulfates of metals of Group IVA of the periodic table.

16. The boot of claim 15 wherein the metallic compound is selected from the group consisting of magnesia, magnesium hydroxide, barium hydroxide, magnesium carbonate, barium carbonate, slaked lime, quick lime, calcium carbonate, calcium silicate, calcium stearate, zinc stearate, calcium phthalate, magnesium phosphite, calcium phosphite, zinc flower, tin oxide, litharge, red lead, white lead, dibasic lead phthalate, dibasic lead carbonate, tin sterate, basic lead phosphite, basic tin phosphite, basic lead sulfite and tribasic lead sulfate.

17. The boot of claim 1 wherein the amount of the component (a) per 100 parts by weight of chlorinated polyethylene (including the copolymer) is 0.1 to 5 parts by weight, the amount of the component (c) is 0.5 to 20 parts by weight per 100 parts by weight of chorinated polyethylene and the amount of the component (b) is 0.5 to 3 moles per mole of the component (a).

* * * * *